(12) United States Patent
Kudoh

(10) Patent No.: US 8,493,667 B2
(45) Date of Patent: *Jul. 23, 2013

(54) LENS APPARATUS AND IMAGING APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/101,855

(22) Filed: May 5, 2011

(65) Prior Publication Data

US 2011/0211266 A1  Sep. 1, 2011

Related U.S. Application Data

(63) Continuation of application No. 12/681,364, filed on Apr. 1, 2010, now Pat. No. 7,957,073.

(30) Foreign Application Priority Data

Oct. 4, 2007 (JP) ................................ 2007-261088

(51) Int. Cl.
*G02B 15/14* (2006.01)
(52) U.S. Cl.
USPC ........................ 359/695; 359/813; 359/817
(58) Field of Classification Search
USPC ....................................................... 359/695
See application file for complete search history.

(56) References Cited

U.S. PATENT DOCUMENTS

| 5,225,939 A * | 7/1993 | Iizuka ........................... 359/811 |
| 6,606,206 B2 * | 8/2003 | Takeshita et al. ............. 359/704 |
| 2008/0106788 A1 * | 5/2008 | Yasutomi et al. ............. 359/432 |

FOREIGN PATENT DOCUMENTS

| JP | 2000-089086 A | 3/2000 |
| JP | 2003-066308 A | 5/2003 |
| JP | 2003-279835 A | 10/2003 |
| JP | 2004-012489 A | 1/2004 |
| JP | 2004-085835 A | 3/2004 |

* cited by examiner

*Primary Examiner* — James Jones
(74) *Attorney, Agent, or Firm* — Canon U.S.A., Inc. IP Division

(57) ABSTRACT

A lens apparatus includes a first lens unit and a second lens unit each of which is configured to move in an optical axis direction, a first cam tube that includes a first cam part and a second cam part respectively on an outer circumferential surface and an inner circumferential surface and moves the first and second lens units respectively in the optical axis direction using the first and second cam parts as the first cam tube rotates around an optical axis, and a linearly moving guide tube that is arranged on an inner circumferential side of the first cam tube and configured to guide the first and second lens units in the optical axis direction.

11 Claims, 6 Drawing Sheets

LENS APPARATUS AND IMAGING APPARATUS

CROSS-REFERENCE TO RELATED APPLICATIONS

This application claims the benefit of U.S. application Ser. No. 12/681,364, filed Apr. 1, 2010 and a foreign priority benefit based on Japanese Patent Application 2007-261088, filed on Oct. 4, 2007, which are hereby incorporated by reference herein in its entirety as if fully set forth herein.

TECHNICAL FIELD

The present invention relates to a lens apparatus suitable for an imaging apparatus such as a compact digital camera.

BACKGROUND ART

Imaging apparatuses described above include one that has a zoom lens barrel having a zoom function which changes an imaging magnification by moving plural lens units (including a lens and its holding member) in an optical axis direction (see Japanese Patent Laid-Open No. 2001-324663).

In the zoom lens barrel disclosed in Japanese Patent Laid-Open No. 2001-324663, a plurality of lens units are moved in the optical axis direction by cams formed on a cam tube which can rotate around the optical axis. Here, a plurality of lens units are prevented from rotating so as not to rotate around the optical axis together with the cam tube. In other words, a plurality of lens units are driven in the optical axis direction by rotations of the cam tube while being guided in the optical axis direction.

Imaging apparatuses are desired to have a higher magnification ratio, but on the other hand they are required to be smaller and in particular thinner so that they can be easily carried around. A multistage stretching structure that shortens the size in the optical axis direction of each tubing member in the zoom lens barrel is conceivable for both the high magnification ratio and the low profile. However, the multistage stretching structure makes it difficult to arrange the cams for driving a plurality of lens units without interfering with each other.

Japanese Patent No. 3,842,087 discloses a zoom lens barrel provided with a first and a second cam for moving first and second lens units in the optical axis direction respectively on an outer circumferential surface and an inner circumferential surface of a rotation tube so that the first and second cams are provided without interfering (intersecting) with each other.

In the zoom lens barrel disclosed in Japanese Patent No. 3842087, the first lens unit and the second lens unit are respectively guided in the optical axis direction by separate tubing members (first and second linearly moving tubes). Therefore, relative decentering between the first and second linearly moving tubes is highly likely to cause similar decentering between the first and second lens units, too. In particular, since lens sensitivity has become high due to size reduction of the zoom lens barrel, even a slight decentering can largely influence the optical characteristics.

DISCLOSURE OF INVENTION

The present invention provides a lens apparatus that can achieve a high variable magnification ratio while minimizing relative decentering between a plurality of lens units, and an imaging apparatus that incorporates this lens apparatus.

A lens apparatus according to one aspect of the present invention includes a first lens unit and a second lens unit each of which is configured to move in an optical axis direction, a first cam tube that includes a first cam part and a second cam part respectively on an outer circumferential surface and an inner circumferential surface and moves the first and second lens units respectively in the optical axis direction using the first and second cam parts as the first cam tube rotates around an optical axis, and a linearly moving guide tube that is arranged on an inner circumferential side of the first cam tube and configured to guide the first and second lens units in the optical axis direction.

Other features and advantages of the present invention will be apparent from the following description given in conjunction with the accompanying drawings, in which like reference characters designate the same or similar parts throughout the figures thereof.

BEST MODE FOR CARRYING OUT THE INVENTION

Referring now to the accompanying drawings, a description will be given of an embodiment of the present invention.

First Embodiment

FIGS. 6 to 10 illustrate the external appearance of a compact digital still camera as an imaging apparatus having a zoom lens barrel (lens apparatus) that is a first embodiment of the present invention.

The camera 12 includes a zoom lens barrel (hereinafter referred to as "lens barrel") 100 that can change imaging magnification.

Figure 6:
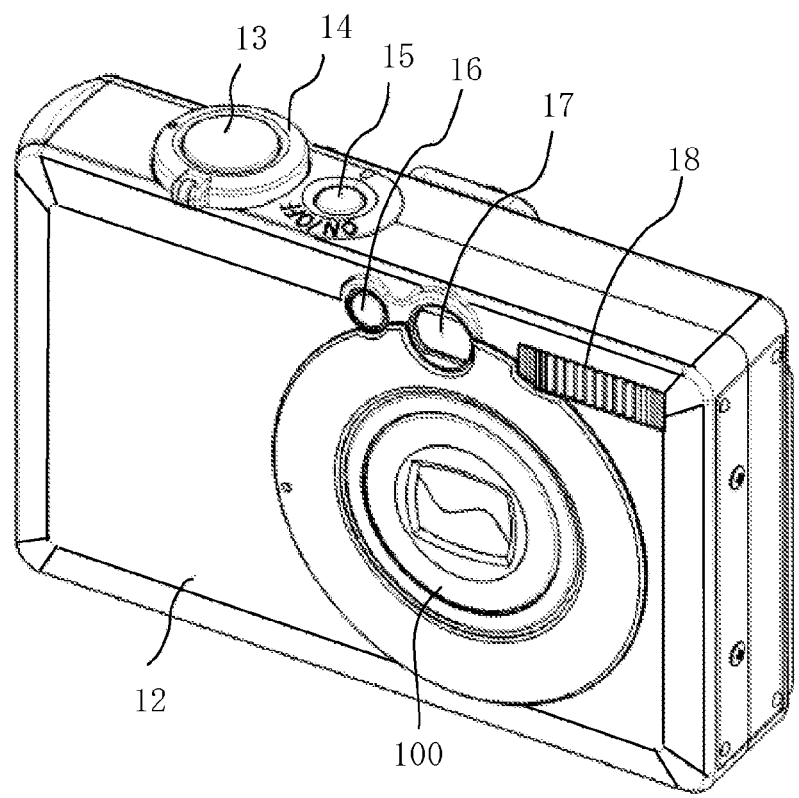
FIG. 6 is a perspective view of a camera (in power-off state) having the lens barrel according to the first and the second embodiments.
Figure 7:
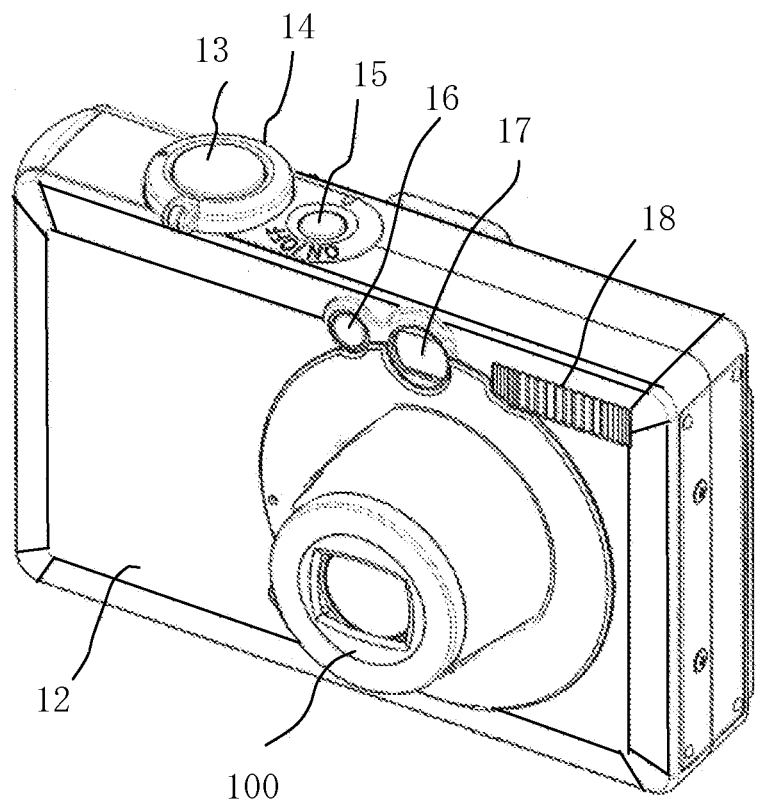
FIG. 7 is a perspective view of the above camera (in power-on state).
Figure 8:
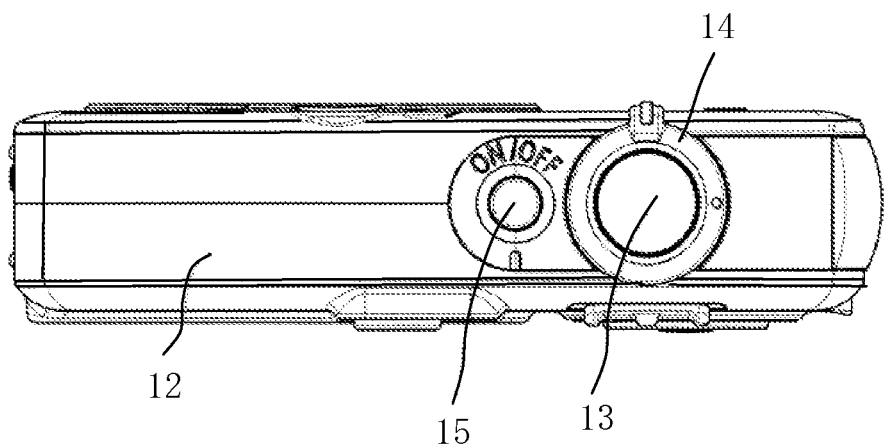
FIG. 8 is a top view of the above camera.
Figure 9:
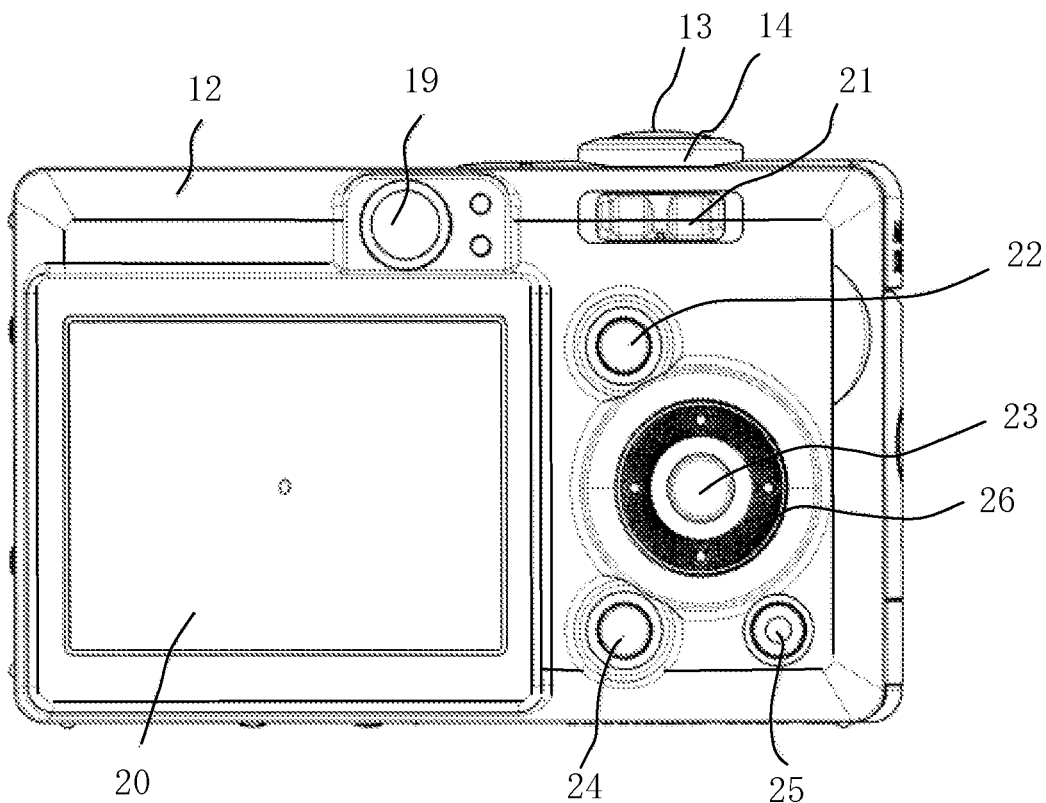
FIG. 9 is a back view of the above camera.
Figure 10:
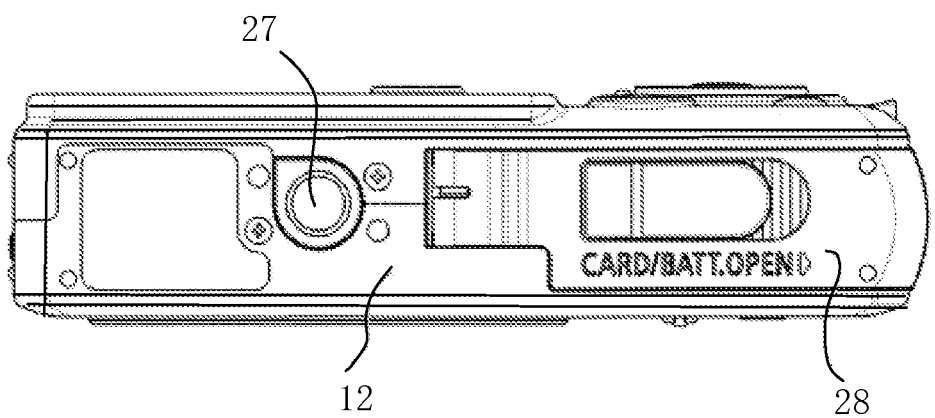
FIG. 10 is a bottom view of the above camera.
Figure 11:
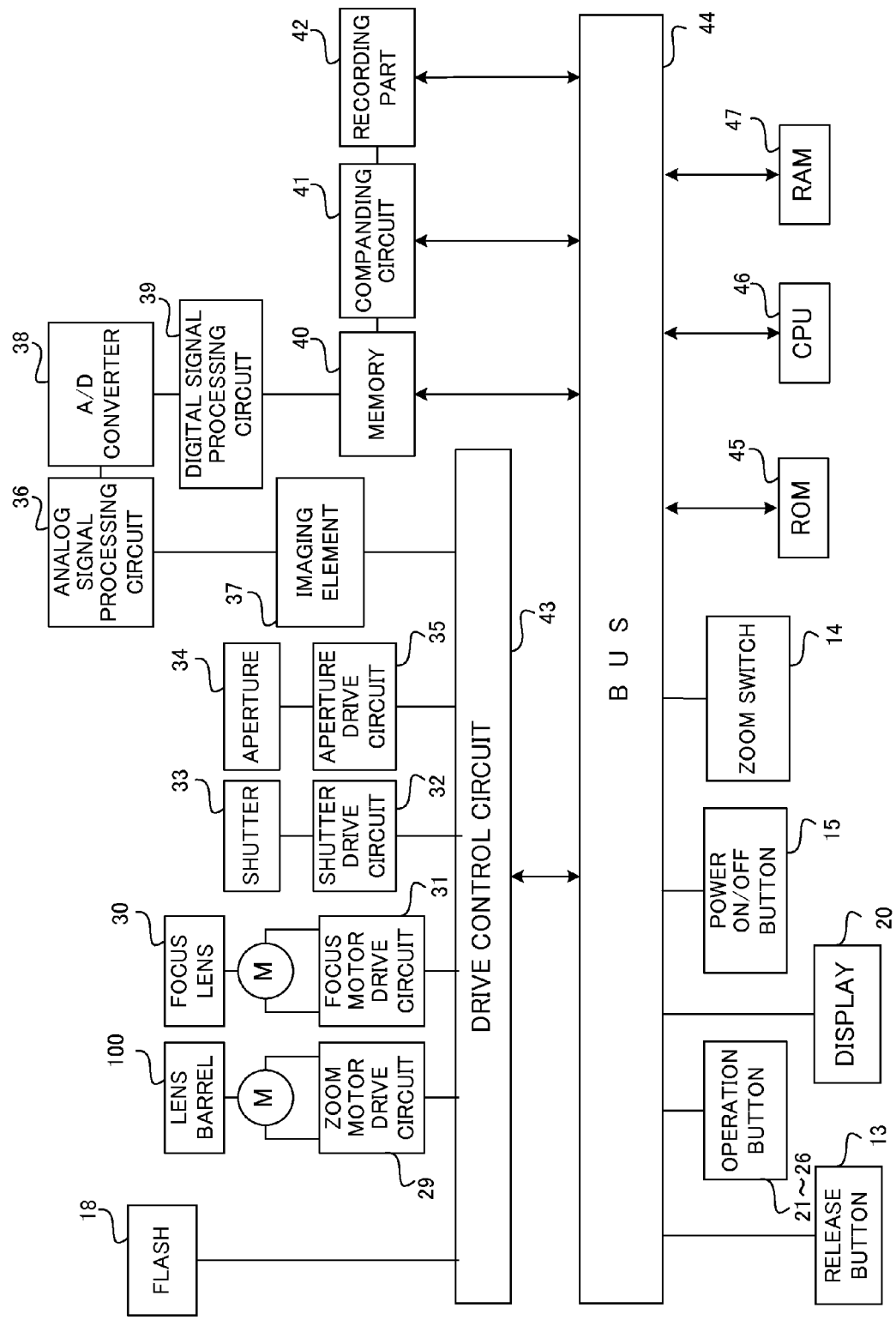
FIG. 11 is a block diagram showing the electrical structure of the above camera.

FIG. 6 shows the camera 12 in a power-off state, which is a state in which the lens barrel 100 is stored inside a camera body. FIG. 7 shows the camera 12 in a power-on state, which is a state in which the lens barrel 100 projects from the camera body (being capable of imaging). Further, FIGS. 8, 9, and 10 respectively show a top view, a back side view, and a bottom view of the camera 12. FIG. 11 shows the electrical structure of the camera 12.

As shown in these drawings, on a front side of the camera 12, a view finder 17 for determining a composition of an object, a light-emitting part 16 for emitting auxiliary light when measuring light and distance, a flash 18 for illuminating the object, and the lens barrel 100 are provided.

On an upper side of the camera 12, a release button 13, a power ON/OFF button 15, and a zoom switch 14 are provided. On a bottom side of the camera 12, a tripod attachment part 27 is provided, as well as slots for inserting a recording medium (card-type semiconductor memory) and a battery inside which are not shown are provided. These slots are covered by a cover 28.

Further, on a backside of the camera 12, operation buttons 21, 22, 23, 24, 25, and 26 are arranged so as to enable setting of various camera functions and switching of modes (still-imaging mode, moving-imaging mode, replay mode etc.). 20 is a display such as an LCD, and 19 is an eyepiece part of the view finder.

Referring to FIG. 11, the display 20 displays image data generated by imaging and stored in a memory 40 or image data or the like read in from the recording medium.

A CPU 46, a ROM 45, and a RAM 47 are connected respectively to each of the release button 13, a drive control circuit 43, the operation buttons 21 to 26, the display 20, the memory 40, and a recording part 42 or the like via buses 44.

An imaging element 37 and the flash 18 are connected to the drive control circuit 43. The imaging element 37 is formed of a zoom motor drive circuit 29, a focus motor drive circuit 31, a shutter drive circuit 32, an aperture drive circuit 35, a CCD sensor, a CMOS sensor and the like. The drive control circuit 43 causes each of these circuits to operate in accordance with signals from the CPU 46.

The ROM 45 stores computer programs for the CPU 46 to control the various parts and circuits mentioned above. The RAM 47 stores data necessary for the control of the various parts and circuits.

When the power ON/OFF button 15 is turned on, the CPU 46 reads out a necessary program from the ROM 45 to start initial operation. At this time, the CPU 46 causes the lens barrel 100 to move from the stored state inside the camera body to the projected state (wide-angle state). When the zoom switch 14 is operated, the CPU 46 drives the lens barrel 100 in telescopic motion through the zoom motor drive circuit 29 to perform zooming by changing the distance between a first lens unit and a second lens unit to be described later.

When the release button 13 is half-pressed, the CPU 46 performs light measurement based on a signal from the imaging element 37, and determines an aperture value, shutter speed, and whether or not light emission of the flash 18 is necessary, based on a measured light value. The CPU 46 also measures the distance from the object, and drives a focus lens 30 (corresponding to the first and second lens units to be described later) through the focus motor drive circuit 31 to an in-focus position to achieve an in-focus state.

When the release button 13 is half-pressed, the CPU 46 causes the aperture 34 to close through the aperture drive circuit 35, as well as causes the shutter 33 to perform open and close operation through the shutter drive circuit 32 to expose the imaging element 37. An output signal from the imaging element 37 is input to a digital signal processing circuit 39 through an analog signal processing circuit 36 and an A/D converter 38. The digital signal processing circuit 39 performs various processing to the signal input from the imaging element 37 to generate an image signal (image data). The image data is stored in the memory 40.

The image data stored in the memory 40 is compressed by a companding circuit 41 and stored in the recording medium through the recording part 42. The image data is also displayed on the display 20.

Figure 1:
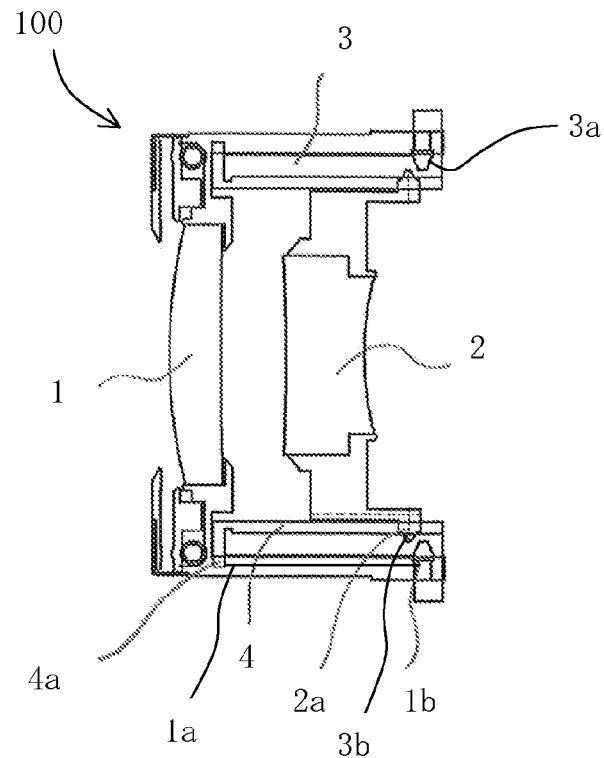
FIG. 1 is a sectional view of a lens barrel (when stored) according to an embodiment of the present invention.
Figure 2:
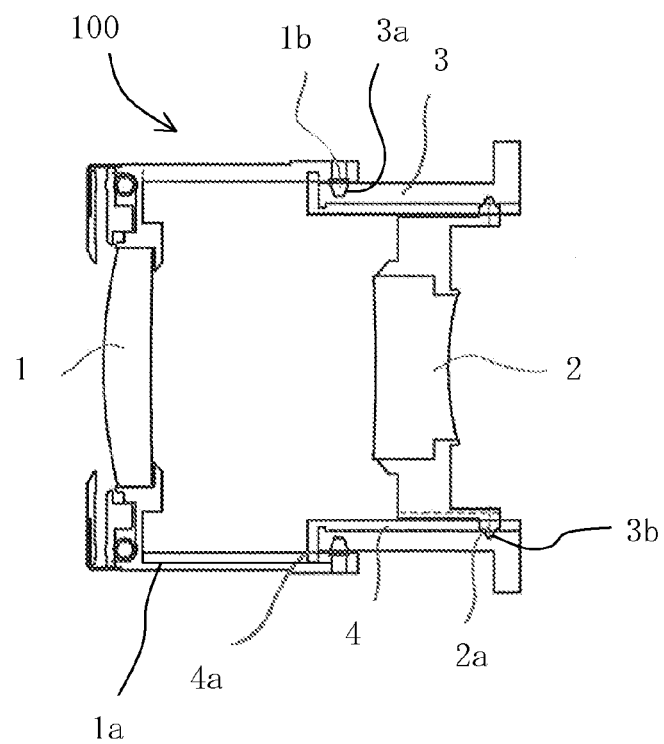
FIG. 2 is a sectional view of the lens barrel (at a wide-angle end) according to the first embodiment.
Figure 3:
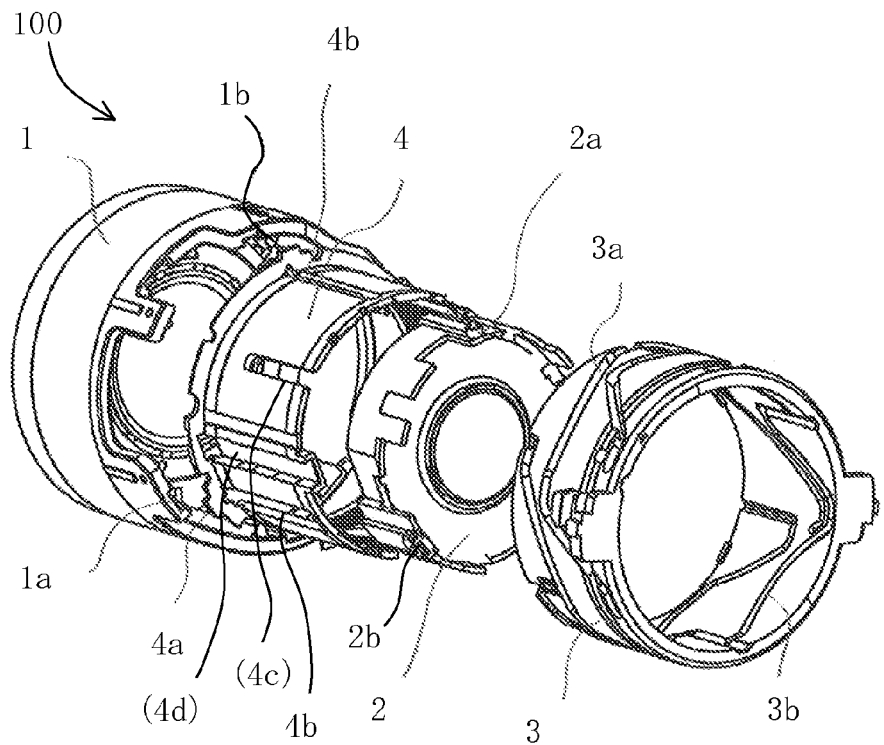
FIG. 3 is an exploded perspective view of the lens barrel according to the first embodiment.

Next, the structure of the lens barrel 100 will be described using FIGS. 1 to 3. FIGS. 1 and 2 are sectional views of the lens barrel 100 respectively showing a stored state and a wide-angle state. FIG. 3 is an exploded perspective view of the lens barrel 100.

In FIGS. 1 to 3, 1 is a first lens unit, which is formed of a first lens and a tubular member holding the lens. Three cam followers 1b are formed such as to be spaced apart by 120° around the optical axis on an inner circumferential surface at a rear end part in the optical axis direction (image-side end part) in the first lens unit 1.

2 is a second lens unit, which is formed of a second lens arranged on a side nearer to the image than the first lens and a member holding the lens. Three cam followers 2a are formed such as to be spaced apart by 120° around the optical axis on an outer circumferential surface at a rear end part in the optical axis direction (image-side end part) in the second lens unit 2.

3 is a cam tube (first cam tube) having three circumferentially formed first cam parts (cam groove parts) 3a on an outer circumferential surface thereof, with which the three cam followers 1b of the first lens unit 1 respectively engage. Three second cam parts (cam groove parts) 3b are circumferentially formed on an inner circumferential surface of the cam tube 3, with which the three cam followers 2a of the second lens unit 2 respectively engage.

A linearly moving guide tube 4 is arranged on an inner circumferential side of the cam tube 3. The cam tube 3 is rotatable around the optical axis along the outer circumferential surface of the linearly moving guide tube 4. On the other hand, the linearly moving guide tube 4 is fixed directly or via another member to a chassis (fixing member) which is not shown in the camera 12 so as to be prevented from rotating around the optical axis.

On the inner circumferential surface of the first lens unit 1, guide groove parts 1a extending in the optical axis direction are formed at three circumferential locations. Three guide protrusions 4a formed on the outer circumferential surface at a front end part in the optical axis direction (object-side end part) of the linearly moving guide tube 4 respectively engage with the three guide groove parts 1a.

Guide protrusions 2b extending in the optical axis direction are formed on the outer circumferential surface of the second lens unit 2 at three locations with different phases from those of the cam followers 2a. The three guide protrusions 2b engage with guide groove parts 4b formed at three circumferential locations to extend in the optical axis direction of the linearly moving guide tube 4.

When the zoom motor drive circuit 29 shown in FIG. 11 rotates a zoom motor M connected thereto, the rotation is transmitted to the cam tube 3 via a power transmission mechanism (not shown) so as to rotate the cam tube 3 around the optical axis. The cam tube 3 rotates relative to the linearly moving guide tube 4.

The rotation of the cam tube 3 gives a drive force respectively to the first and second lens units 1 and 2 in the optical axis direction and in a direction around the optical axis due to the cam effect between the first and second cam parts 3a and 3b and the cam followers 1b and 2a. At this time, the first and second lens units 1 and 2 are prevented from rotating around the optical axis by the guide groove parts 1a and the guide protrusions 2b respectively making engagement with the guide protrusions 4a and the guide groove parts 4b of the linearly moving guide tube 4. Therefore, the first and second lens units 1 and 2 move only in the optical axis direction.

According to this embodiment, the first and second lens units 1 and 2 are guided to move linearly in the optical axis direction by a single linearly moving guide tube 4 (in other words, they are prevented from rotating around the optical axis). Therefore, as compared to the case in which the first and second lens units 1 and 2 are guided in the optical axis direction by separate members as conventionally, relative decentering between the first and second lens units 1 and 2 is reduced. This accordingly improves the optical performance of the imaging optical system formed by the first and second lens units 1 and 2 and enables a high-quality image to be obtained by the camera 12.

Since the linearly moving guide tube 4 is arranged on the inner circumferential side of the cam tube 3, the diameter of the lens barrel 100 can be made smaller as compared to the case where it is arranged on the outer circumferential side of the cam tube 3.

While the imaging optical system is formed of two lens units in this embodiment, a third lens unit may be added, or four or more lens units may be used to form the system.

Second Embodiment

Figure 4:
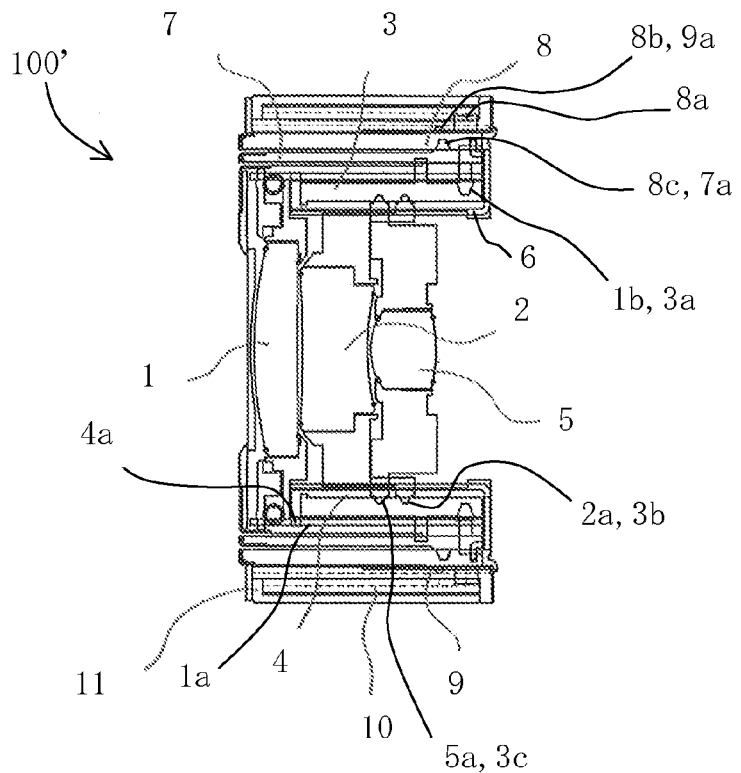
FIG. 4 is an exploded perspective view of the lens barrel according to the second embodiment.
Figure 5:
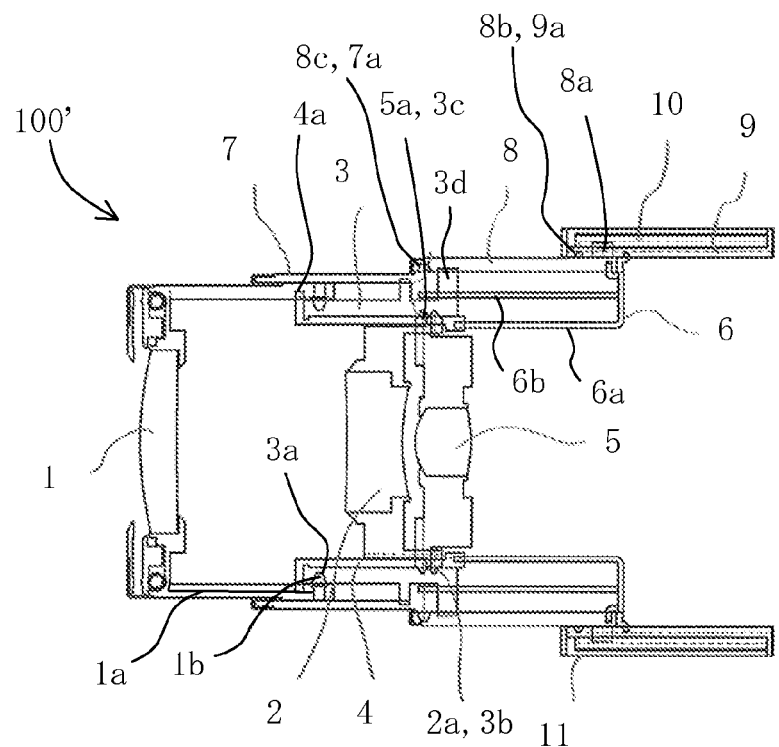
FIG. 5 is an exploded perspective view of the lens barrel according to the second embodiment.

FIGS. 4 and 5 show the structure of a zoom lens barrel 100' that is a second embodiment of the present invention. The zoom lens barrel (hereinafter referred to as "lens barrel") 100' of this embodiment is used in the camera 12 shown in FIGS. 6 to 10, too. FIGS. 4 and 5 respectively show a stored state and a wide-angle state of the lens barrel 100'. In the description below, constituent elements and parts identical to those in the second embodiment are designated by the same designation numbers as those in the first embodiment. The structure shown in FIG. 3 is basically common to this embodiment, and the constituent elements or parts that are not shown in FIG. 4 and FIG. 5 will be described using the designation number in FIG. 3.

1 is a first lens unit, which is formed of a first lens and a tubular member holding the lens. Three cam followers 1b are formed such as to be spaced apart by 120° around the optical axis on an inner circumferential surface at a rear end part in the optical axis direction (image-side end part) in the first lens unit 1.

2 is a second lens unit, which is formed of a second lens arranged on a side nearer to the image than the first lens and a member holding the lens. Three cam followers 2a are formed such as to be spaced apart by 120° around the optical axis on an outer circumferential surface at a rear end part in the optical axis direction (image-side end part) in the second lens unit 2.

5 is a third lens unit, which is formed of a third lens arranged on a side further nearer to the image than the second lens and a member holding the lens. Three cam followers 5a are formed such as to be spaced apart by 120° around the optical axis on an outer circumferential surface of the third lens unit 5.

3 is a cam tube (first cam tube) having three circumferentially formed first cam parts (cam groove parts) 3a on an outer circumferential surface thereof, with which the three cam followers 1b respectively engage, and three circumferentially formed second cam parts (cam groove parts) 3b on an inner circumferential surface thereof, with which the three cam followers 2a respectively engage. Further, on the inner circumferential surface of the cam tube 3, three third cam parts (cam groove parts) 3c are circumferentially formed, with which the three cam followers 5a respectively engage.

A linearly moving guide tube 4 is arranged on an inner circumferential side of the cam tube 3. The cam tube 3 is rotatable around the optical axis along the outer circumferential surface of the linearly moving guide tube 4.

On the outer circumferential surface of the linearly moving guide tube 4, guide groove parts 4d (see FIG. 3) extending in the optical axis direction are formed at two circumferential locations. Linearly moving keys 6a formed to extend in the optical axis direction to a guide plate (guiding member) 6 attached to a fixed tube 9 that is fixed to a chassis (not shown) of the camera 12 engage with the guide groove parts 4d. This prevents the linearly moving guide tube 4 from rotating around the optical axis. The guide plate 6 engages with the fixed tube 9 such as to be movable in the optical axis direction while being prevented from rotating around the optical axis.

On the inner circumferential surface of the first lens unit 1, guide groove parts 1a extending in the optical axis direction are formed at three circumferential locations. Three guide protrusions 4a formed on the outer circumferential surface at a front end part in the optical axis direction (object-side end part) of the linearly moving guide tube 4 respectively engage with the three guide groove parts 1a.

Guide protrusions 2b (see FIG. 3) extending in the optical axis direction are formed at three locations on the outer circumferential surface of the second lens unit 2. The three guide protrusions 2b engage with guide groove parts 4b (see FIG. 3) formed at three circumferential locations to extend in the optical axis direction of the linearly moving guide tube 4.

Guide protrusions (not shown) extending in the optical axis direction are formed at three locations on the outer circumferential surface of the third lens unit 5. The three guide protrusions engage with guide groove parts 4c (see FIG. 3) formed at three circumferential locations to extend in the optical axis direction of the linearly moving guide tube 4.

The cam tube 3 and the linearly moving guide tube 4 are rotatable relative to each other by a bayonet structure, and coupled to each other so as to be integrally movable in the optical axis direction. Since the linearly moving guide tube 4 is prevented from rotating as mentioned above, in practice, the cam tube 3 rotates relative to the linearly moving guide tube 4, and moves in the optical axis direction integrally with the linearly moving guide tube 4.

A moving cam tube (second cam tube) 8 is arranged on an inner circumferential side of the fixed tube 9. A cam follower 8b is formed on an outer circumferential surface in a rear part in the optical axis direction of the moving cam tube 8, this cam follower 8b engaging with a cam part (cam groove part) 9a formed on the inner circumferential surface of the fixed tube 9. Further, a rotation transmitting protrusion 8a is formed on the outer circumferential surface in a rear end part of the moving cam tube 8. The rotation transmitting protrusion 8a engages with a drive ring 10, which is arranged on the outer circumferential side of the fixed tube 9 and rotatable around the optical axis relative to the fixed tube 9. Therefore, the moving cam tube 8 rotates with the rotation of the drive ring 10.

The moving cam tube 8 and the guide plate 6, too, are rotatable relative to each other by a bayonet structure and coupled to each other so as to be integrally movable in the optical axis direction. Since the guide plate 6 is prevented from rotating as mentioned above, in practice, the moving cam tube 8 rotates relative to the guide plate 6 and the fixed tube 9, and moves in the optical axis direction relative to the fixed tube 9 integrally with the guide plate 6.

A cylindrical member 7 as an external member is arranged on the outer circumferential side of the cam tube 3 and the first lens unit 1. The cylindrical member 7 forms an external appearance surface of the lens barrel 100' together with the moving cam tube 8, as well as closes a gap between the first lens unit 1 and the cam tube 3 to prevent penetration of dirt or dust from outside into the lens barrel 100'.

The cylindrical member 7 and the cam tube 3 are rotatable relative to each other by a bayonet structure, and coupled to each other so as to be integrally movable in the optical axis direction.

A cam follower 7a is formed on an outer circumferential surface in a rear end part of the cylindrical member 7, this cam follower 7a engaging with a cam part (cam groove part) 8a formed on the inner circumferential surface of the moving cam tube 8.

The cylindrical member 7 is guided in the optical axis direction (prevented from rotating around the optical axis) by the linearly moving keys 6b formed to the guide plate 6 to extend in the optical axis direction.

Guiding the cylindrical member 7 to move linearly in the optical axis direction as described above rotates the moving cam tube 8, which in turn causes the cylindrical member 7 to move in the optical axis direction together with the cam tube 3 and the linearly moving guide tube 4 due to the cam effect between the cam part 8a and the cam follower 7a. At this time, the cam tube 3 moves in the optical axis direction while rotating around the optical axis, as it engages with the inner circumferential surface of the moving cam tube 8 to be rotatable integrally therewith at a protrusion part 3d.

11 is a cover tube, which covers the outer circumferential surface of the drive ring 10. The cover tube 11 is held by the fixed tube 9.

When the zoom motor drive circuit 29 shown in FIG. 11 rotates a zoom motor M connected thereto, the rotation is transmitted to the drive ring 10 via a power transmission mechanism (not shown) so as to rotate the drive ring 10 around the optical axis. When the drive ring 10 rotates, the moving cam tube 8 rotates around the optical axis, as well as moves in the optical axis direction relative to the fixed tube 9 and the drive ring 10 due to the cam effect between the cam follower 8b and the cam part 9a of the fixed tube 9. The guide plate 6 also moves together with the moving cam tube 8 in the optical axis direction relative to the fixed tube 9.

When the moving cam tube 8 moves in the optical axis direction as it rotates, the cylindrical member 7 moves in the optical axis direction relative to the moving cam tube 8 as described above, which causes the cam tube 3 also to move in the optical axis direction together with the cylindrical member 7, while rotating integrally with the moving cam tube 8. The linearly moving guide tube 4 moves in the optical axis direction together with the cam tube 3 and cylindrical member 7 without rotating.

The rotation of the cam tube 3 gives a drive force respectively to the first and second lens units 1 and 2 in the optical axis direction and in a direction around the optical axis due to the cam effect between the first and second cam parts 3a and 3b and the cam followers 1b and 2a. The third lens unit 5 also receives a drive force in the optical axis direction and in a direction around the optical axis due to the cam effect between the third cam parts 3c and the cam followers 5a. At this time, the first, second, and third lens units 1, 2, and 5 are prevented from rotating around the optical axis by the guide groove parts 1a, the guide protrusions 2b, and the guide protrusions (not shown) respectively making engagement with the guide protrusions 4a and the guide groove parts 4b and 4c of the linearly moving guide tube 4. Therefore, the first, second, and third lens units 1, 2, and 5 move only in the optical axis direction.

According to this embodiment, the first, second, and third lens units 1, 2, and 5 are guided to move linearly in the optical axis direction by a single linearly moving guide tube 4 (in other words, they are prevented from rotating around the optical axis). Therefore, as compared to the case in which the first, second, and third lens units 1, 2, and 5 are guided in the optical axis direction by separate members as conventionally, relative decentering between these lens units 1, 2, and 5 is reduced. This accordingly improves the optical performance of the imaging optical system formed by the first, second, and third lens units 1, 2, and 5 and enables a high-quality image to be obtained by the camera 12.

Moreover, according to this embodiment, since the cam tube 3 and the linearly moving guide tube 4 are stretched out in the optical axis direction relative to the fixed tube 9, a lens barrel with a larger entire length, i.e., higher variable magnification ratio, than that of the lens barrel of the first embodiment can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

FIELD OF INDUSTRIAL APPLICATION

The present invention provides a lens apparatus that can achieve a high variable magnification ratio while minimizing relative decentering between a plurality of lens units, and an imaging apparatus that incorporates this lens apparatus.

The invention claimed is:

1. A lens apparatus, comprising:
a first lens unit and a second lens unit each of which is configured to move in an optical axis direction;
a first cam tube that includes a first cam part and a second cam part respectively on an outer circumferential surface and an inner circumferential surface, the first cam tube moving the first and second lens units respectively in the optical axis direction using the first and second cam parts as the first cam tube rotates around an optical axis;
a linearly moving guide member that is arranged on an inner circumferential side of the first cam tube and configured to guide the first and second lens units in the optical axis direction; and
a second cam tube configured to rotate around the optical axis and to move the first cam tube in the optical axis direction together with the linearly moving guide member;
a third lens unit configured to move in the optical axis direction, wherein the first cam tube includes a third cam part formed on the inner circumferential surface,
wherein the linearly moving guide member is fixed directly or via another member to a chassis.

2. An imaging apparatus including the lens apparatus according to claim 1.

3. The lens apparatus according to claim 1, further comprising a cylindrical member configured to be arranged on the outer circumferential side of the first cam tube, wherein the cylindrical member and the first cam tube are rotatable relative to each other by a bayonet structure.

4. The lens apparatus according to claim 3, wherein the cylindrical member and the first cam tube are coupled to each other so as to be integrally movable in the optical in the optical axis direction.

5. The lens apparatus according to claim 1, wherein the linearly moving guide member guides the third lens unit in the optical axis direction.

6. A lens apparatus comprising:
a first lens unit and a second lens unit each of which is configured to move in an optical axis direction;

a first cam tube that includes a first cam part and a second cam part respectively on an outer circumferential surface and an inner circumferential surface, the first cam tube moving the first and second lens units respectively in the optical axis direction using the first and second cam parts as the first cam tube rotates around an optical axis;

a linearly moving guide member that is arranged on an inner circumferential side of the first cam tube and configured to guide the first and second lens units in the optical axis direction; and a second cam tube configured to rotate around the optical axis and to move the first cam tube in the optical axis direction together with the linearly moving guide member;

a third lens unit configured to move in the optical axis direction, wherein the first cam tube includes a third cam part formed on the inner circumferential surface, wherein the linearly moving guide member is fixed directly or via another member to a chassis, and wherein the third cam part engages a cam follower of the third lens unit.

7. The lens apparatus according to claim 1, wherein the linearly moving guide member guides the third lens unit in the optical axis direction.

8. An imaging apparatus including the lens apparatus according to claim 6.

9. The lens apparatus according to claim 7, further comprising a cylindrical member configured to be arranged on the outer circumferential side of the first cam tube, wherein the cylindrical member and the first cam tube are rotatable relative to each other by a bayonet structure.

10. The lens apparatus according to claim 6, wherein the cylindrical member and the first cam tube are coupled to each other so as to be integrally movable in the optical axis direction.

11. The lens apparatus according to claim 6, wherein the linearly moving guide member guides the third lens unit in the optical axis direction.

* * * * *